United States Patent [19]
Martin et al.

[11] Patent Number: 5,283,520
[45] Date of Patent: Feb. 1, 1994

[54] METHOD OF DETERMINING THICKNESS OF MAGNETIC PIPE BY MEASURING THE TIME IT TAKES THE PIPE TO REACH MAGNETIC SATURATION

[76] Inventors: Philip W. Martin; Philip R. Martin, both of P.O. Box 1635, Whittier, Calif. 90609

[21] Appl. No.: 680,558

[22] Filed: Apr. 4, 1991

[51] Int. Cl.[5] ............... G01B 7/10; G01N 27/82; G01R 33/12; G01V 3/26
[52] U.S. Cl. ..................... 324/220; 324/229; 324/238; 324/242; 324/339; 324/346
[58] Field of Search ............... 324/219–223, 324/229, 238–243, 339, 346, 368

[56] References Cited

U.S. PATENT DOCUMENTS

| | | | |
|---|---|---|---|
| 2,357,666 | 9/1944 | Kuehni | 324/229 |
| 2,770,773 | 11/1956 | Cooley | 324/221 |
| 2,817,808 | 12/1957 | Gieske | 324/221 |
| 3,277,363 | 10/1966 | Schuster | 324/346 X |
| 3,405,353 | 10/1968 | Smith et al. | 324/229 |
| 4,704,579 | 11/1987 | Pyatt et al. | 324/221 X |
| 4,715,442 | 12/1987 | Kahil et al. | 324/229 X |
| 5,038,107 | 8/1991 | Gianzero et al. | 324/346 X |

*Primary Examiner*—Gerard R. Strecker
*Attorney, Agent, or Firm*—Hill, Steadman & Simpson

[57] ABSTRACT

A method for determining the thickness of a pipe by inserting a coil into the pipe and applying a voltage to the coil and measuring the time it takes for current in the coil to magnetically saturate the pipe and determining the thickness of the pipe from the measure time.

4 Claims, 8 Drawing Sheets

METHOD OF DETERMINING THICKNESS OF MAGNETIC PIPE BY MEASURING THE TIME IT TAKES THE PIPE TO REACH MAGNETIC SATURATION

BACKGROUND OF THE INVENTION

1. Field of the Invention

This invention relates to a method and apparatus to be lowered into a well, to determine the thickness of the pipe at localized areas in the well and also the electrical conductivity of the surrounding earth formation at selected depths in the well.

2. Description of Related Art

Progress in the field of electromagnetics has been with much travail and difficulty. Electromagnetic signals presently are being received from satellites at many millions of miles distance but this advancement was not accomplished in a single bound. Electromagnetic geophysical advancements have likewise come slowly.

In 1919, a patent was issued on induction geophysics. During the 1920's, Hans Lundburg and his group of Swedish scientists made a major geophysical find in Sweden with electromagnetic geophysics. They later failed to crack the oil patch geophysics in the late 1920's with inductive loops a quarter mile square.

Schlumberger worked on induction logging in the 1940's. According to Allaud and Martin, though Schlumberger was commercially logging in 1949, it was 1956 before they had what they considered a "solution". Thus the induction log took over forty five years of development from the patented idea of 1919 until Schlumberger's apparatus.

There are now three types of commercial magnetic inspection systems on the oil field market. All of them have been in the field for over 20 years. They are as follows:

1. Direct current magnetic devices: The pipe is polarized by a magnetic field being induced down the length of the pipe by an assembly of primary permanent magnets sometimes coupled to the pipe by steel wire brushes. The north and south poles of these magnets are spaced apart by about a foot along the length the pipe. Midway between the poles of the magnets there is an array of pickup coil assemblies which are distributed around the inside diameter of the pipe. This permanent magnet excited tool is chiefly used in pipeline pig surveys.

The same principle is used in oil wells where a direct current electromagnetic field replaces the permanent magnet and the brushes are eliminated. The signal power generated by the pickup coils in these tools is speed dependent, like the permanent magnet tools, and rises as the square of the speed that the tool moves through the pipe. The shape of the anomaly in the pipe as well as its depth within the pipe wall is also a factor. Thus, any interpretation of the nature of the casing flaws is extremely difficult. Furthermore, in the brush type tool, there are three breaks for each anomaly. First, an electrical pulse is induced when the first brush reaches the anomaly, a second electrical pulse is induced when the pickup structure reaches the anomaly and a third electrical pulse is induced when the next brush leaves the anomaly. Also, there is a signal generated in each of the adjoining pickups over about 5 inches of circumference for a ⅜ inch hole. In larger 30 inch OD pipe one can vaguely define the hole's diameter or shape, but in an oil well where the most common casing is 5½ inch OD pipe this lack of definition makes the anomaly almost undiscernible.

2. High frequency eddy current devices: These devices induce eddy currents into the inner surface of the pipe with high frequency exploration coils. They can deliver excellent resolution but are only effected by shallow defects such as pits or scale on the inside wall of the pipe. In the oil well type tools, the eddy current detectors are run along with the permanent magnet or direct current magnetic field pickups in hopes that the difference between anomalies inside of the pipe and somewhere in the wall of the pipe can be discerned.

3. Low frequency phase shift method: Commercially the most successful type of casing inspection is the low frequency, i.e. 60 hertz, phase shift method. An AC transmitter coil is excited inside of the pipe. At a distance from the exciter coil, say a foot or two away, a receiver coil is used to pick up a portion of the current induced in the pipe, and then measuring the phase shift at the receiver coils. The phase shift measured is proportional to the average wall thickness of the pipe between the transmitter and the receiver coil. The weight of the pipe in this span may be 20 or more pounds. Because this measurement averages the wall thickness between the coils, it is very good at measuring general corrosion or average wear of the pipe. However, most leaks are caused by pitting in the pipe or extensive wear. A tiny hole in the casing, which may equal only an ounce or less of metal, cannot be detected. That is enough to ruin an oil well. The process is not sensitive enough to measure an ounce out of 20 to 40 pounds which represents a fraction of 1% of the total. The tool can scarcely detect a 10% loss of metal. As a matter of fact three inch diameter holes through the pipe have been totally missed in oil wells with this tool. Not a little of this difficulty is caused by variations in pipe roundness, by pipe diameter, by mechanical strains present in the pipe, just how the pipe is cooled when manufactured and variations in the mill producing the pipe.

Even though this low frequency device is the best commercial device in the field, the companies that run it only claim a determination of three levels of discernment: which means in essence "probably good", "perhaps bad" and "probably bad".

SUMMARY OF THE INVENTION

This invention relates to a method and structure which simultaneously solves the following long-felt needs in the oil fields.

CASING INSPECTION

One of these long-felt needs is to make the steel pipe transparent so that the outside of the pipe and wall thickness can be inspected for damage such as corrosion, pitting and wear and to resolve these measurements to fine detail on the X, Y and Z axes.

We have built and widely used in oil field service the best commercial magnetic casing inspection tools. From our experience it appears we have been able to improve the resolution on pipe wall thickness by 10 fold. It appears we have been able to improve the longitudinal resolution by more than 10 fold. It appears we have been able to resolve the radial segmental resolution by 15 fold. This constitutes a major breakthrough in casing inspection.

Our invention makes detailed inspection of the well casing for small holes or impending casing failure, which can cause a good oil well to instantly go from valuable oil production to a worthless salt water well. Today's best commercial casing inspection tools have failed to detect a hole as large as three inches in diameter in the walls of the casing. Our invention will locate a comparatively tiny hole.

Our device can be calibrated in thousandths of an inch wall thickness and that calibration can be isolated to discreet localized areas on both radius and length.

It is desirable to define the nature of internal anomalies on the inside skin of the pipe and to compensate for them. By applying an AC of the proper frequency to our structure, we can detect pits and roughness or scale on the inside wall of the pipe. Such anomalies produce an effective gap in the AC magnetic path. It takes only a tiny gap to produce a large change because the magnetic permeability of the pipe may be thousands of times as high as an anomaly. The presence of a comparatively small anomaly or nonconformity on the inside of the pipe can be detected by the judicious choice of the appropriate frequency. For this high frequency measurement it is not necessary to drive the pipe into saturation.

Thus the high frequency AC impedance becomes somewhat analogous to an inside caliper.

INDUCTION LOGGING THROUGH THE CASING

General Explanation

Our invention fills another long-felt need by making the steel casing transparent so that the surrounding earth formations which are producing gas and oil can be examined or logged for petroleum depletion. Once conditions outside the well are known, steps may be taken to enhance production.

Our invention determines the electrical resistivity or conductivity of the surrounding earth formations through the casing thus bringing to the cased well advantages similar to open hole electric logging. Before our invention the open hole electric log, or its reciprocal the open hole induction log, could only be meaningfully run before the casing was installed in the well because the casing shorts or blocks out further electrical measurements of either. The electric log can only be run in the well during a few static hours of the well's lifetime before the casing is set. On the other hand, the well may have 40 years of dynamic productivity, through which period there are constant important changes. The producer is now virtually blind to dynamic changes which may be taking place back of the casing. If the producer knows about what is going on he can take remedial action which can make the well very much more productive.

Prior to our method the only logs that can begin to determine what is going on in the fluid outside of the casing are the neutron logs, either pulsed or steady state. These nuclear logs have only a very limited depth of penetration into the formation and are effected by the various nuclear cross sections and energy products of all 96 elements and their host of isotopes, all of which in total produce relatively small changes replete with such a complex welter of data as to make reliable interpretation virtually impossible or maddeningly complex. Thus invading salt water is disappointingly hard to detect by nuclear means.

By contrast, the electric log is delightfully simple as it is based on the fact that oil or gas are electrical insulators. Oil and gas are usually produced from sand and are usually swept out of the sand and replaced by salt water.

Most oil is produced from porous sands. Most sands are a matrix of silicon or aluminum oxides, both of which are excellent electrical insulators. Thus, the electrical conductivity of sands is dependant on the fluid in the pores in the sand.

There are only two types of fluid in the earth. The most common is water. Water, in its natural state at great oil field depths, is generally very hot and salty. Therefore, it is an excellent electrical conductor.

The other fluids found in sand are petroleum in the forms of oil or gas which are both electrical insulators. A very pure oil sand can present a resistance a million times higher than the same sand full of saturated, hot salt water. Thus, the interpretation of an electrical log is comparatively simple. The presence of oil in the sand versus salt water can change its resistance a million fold. This same fluid replacement produces a comparatively minuscule change in a neutron log.

Commonly in an ideal petroleum sand there is an upper horizon in the sand full of gas. Below that there is a horizon full of oil and below that a horizon full of salt water.

The operator first attempts to gently produce the oil by perforating the casing at the oil horizon, trying to make the gas force the oil to the surface. As the oil is produced the salt water rises into the oil producing horizon sweeping the oil ahead of it. But oil in nature is seldom found in an ideal reservoir. The producer desperately needs to know how the reservoir is behaving. Very often salt water may channel through a producing zone and what was a fine oil well one day, is a salt water producer the next day. With our inspective tool we can determine the performance of the geological formation and the operator can use the proper production procedures or take the proper steps to restore production once salt water has broken through. There are doubtlessly millions of barrels of unrecovered oil around the hundreds of thousands of abandoned cased wells that can be recovered providing the operator can discover where the oil is.

Technical Aspects

It is important to maximize the solid, direct ferromagnetic flux path because the magnetic permeability of steel can be over 10,000 times higher than any other material in the well, for instance, air.

It is also important to keep the magnetic flux path as short as reasonably possible as the flux density per ampere turn falls directly with the path length.

The magnetic structure of the invention packs the magnetic lines generated by the electromagnetic coil into a short and concentrated zone in the pipe, thereby saturating and isolating that zone of the pipe so that, in the casing inspection function, the ferromagnetic cross section of the pipe can be measured.

While this localized ring-shaped area of the pipe is magnetically saturated its magnetic permeability collapses and it becomes a transparent window to alternating current. A part of the AC field escapes the outside of the pipe and induces a magnetic alternating field into the surrounding earth.

In other words magnetically saturated pipe becomes a two way AC window through the pipe. The inventive device produces one window each for a transmitter, receiver and possibly a bucker. Through these windows the electrical characteristics of the earth surrounding the pipe can be measured.

Although by use of the invention a transparent window in the pipe has been formed, the pipe still wields a powerful influence. Because of the pipe's non-uniform nature aberrations are produced. It is desirable to compensate for these aberrations.

An aberration which can be compensated for is wall thickness of the pipe. The wall thickness can be measured by the energy necessary to magnetically saturate the pipe. By knowing the wall thickness, this factor can be fed into the computation so as to obtain a more accurate measurement of the earth's true resistance.

Three structures may be used, one to transmit and two to receive, with one receiver close to the transmitter and another receiver at a distance. This results in both received signals coming through the pipe. By proper use of the bucking of the signal much of the casing effect can be balanced out. Bucking also helps compensate for differences in the casing characteristics. This approach also focuses out the formation effect near the wall of the well.

We have had to overcome many technical hurdles such as follows:

Our first tests with a close coupled pickup coil around the outside of the pipe indicated that about 70% of the signal through the pipe was lost. When we put a 30" OD pickup coil around the pipe, only about 10% of the signal was received as compared to the signal without the pipe. The casing killed 90% of the signal. A similar attenuation occurred when we drove the signal back into the pipe to the receiver. Thus the losses encountered were ten times as great going out, ten times as great coming in, totaling about 100 times as bad as a well without casing. On further studies of the field shape for both window opening and alternating magnetic field we deduct that the magnetic field at a short distance is disk shaped but at a distance the shape of the field resembles the classical field of a helix coil. This posed a real challenge.

These hurdles have been overcome with the invention and now a marked change for simulated earth of the most salty nature has resulted.

We have experimented with bucking out the undesired received signal in the manner which is called a focused log as described in *Well Logging for Earth Scientists*, by Darwin V. Ellis, Library of Congress Catalog Number 87-81289, FIG. 6-11. We have opened magnetic windows through the pipe so that both the receiver and the bucker signals can pass back into the pipe.

Our purpose however is not only to buck out the earth signal close to the hole, but to compensate for any variation in the casing attenuation if both bucking and desired formation signals have to come through similar sections of the casing. The algebraic sums tend to cancel out.

Objectives

It is a first objective to inspect casing or tubular goods for structural integrity in great detail and/or in bulk for flaws, holes, pitting or anomalies.

It is a second objective to focus inspection to fine detail to both the inside and outside surface areas and to depth or wall thickness of the casing or tubular goods.

It is a third objective to saturate and magnetically anchor a casing inspection structure in the pipe so that measuring structure becomes momentarily magnetically a part of the pipe structure. When the anchor is activated, it may produce in the order of a ton of pull.

It is a fourth objective to produce a structure of greater magnetic cross section than the tubular member so that the tubular member being inspected is driven into saturation while the exciting structure is comparatively unsaturated.

It is a fifth objective to lower a pipe-conforming, segmented, ferromagnetic structure with a magnetic cross section greater than the localized magnetic cross section of the surrounding pipe, then energizing one or more windings surrounding that structure and/or segments of that structure which are powerful enough to drive an isolated, ring-shaped, and segmented, localized, radial area of the pipe perpendicular to its axis into magnetic saturation. The tool is thus anchored magnetically in and to the pipe, causing the structure to become an integral magnetic and mechanically anchored part of the pipe. The energy, expressed in ampere turns per second, necessary to saturate the pipe is in proportion to the magnetic cross section of the pipe. Thus the local wall thickness of the pipe adjacent to each segment of the magnetic structure can be determined and also the average wall thickness of the magnetically saturated ring of pipe can be determined by either measuring the sum of voltages induced in each winding surrounding each segment or by measuring the voltage induced in a winding surrounding all segments of the structure.

It is a sixth objective to saturate adjoining segments in a ring around the pipe, thus, in effect, focusing the magnetism to a narrow radial segment of the pipe to determine the integrity of that localized area of pipe.

It is a seventh objective to isolate a short longitudinal length of the pipe, thus, in effect, focusing the magnetism to a short length of pipe to determine the integrity of that short length of pipe.

It is an eighth objective to simultaneously isolate radial and longitudinal sections of the pipe to measure the integrity of any desired isolated area of the pipe.

A ninth objective is to make the pipe transparent in order to explore the surrounding earth formations as is done by an induction or electric log in an uncased well.

A tenth objective is to determine the attenuation of the signal transmitted out through the tubing or casing due to anomalies in the casing.

An eleventh objective is to determine and minimize or neutralize the effects of the casing on the signal returning from the formation.

A twelfth objective is to make the casing transparent to either or both outgoing and returning signals with the intent of measuring the earth's impedance.

A thirteenth objective is to run two or more of the magnetic structures in the well at spaced distances, one structure to transmit and a second structure to receive in order to determine the attenuation or phase shift caused by the surrounding earth formation but not limited to these measurements.

A fourteenth objective is to lower three or more such structures into the well. One such structure to transmit plus two such structures to receive the algebraic sum of the two signals in a way such that casing anomalies will cancel out and thus enable true measurement of the formation electrical conductance or resistance at desired radiuses from the casing and well bore.

A fifteenth objective is to measure the non-conformities of the inside wall of the pipe, for instance: pits, scale, bumps and inclusions.

A sixteenth objective is to measure any non-conformities either individually or in combination with any other so as to determine the characteristics of the pipe.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

Referring to the drawings which are for illustrative purposes only.

DETAILED DESCRIPTION OF THE PREFERRED EMBODIMENTS

For ease of illustration all switches and relays are shown in the mechanical form. Generally most of the switches and relays are in the electronic or solid state form.

Figure 1:
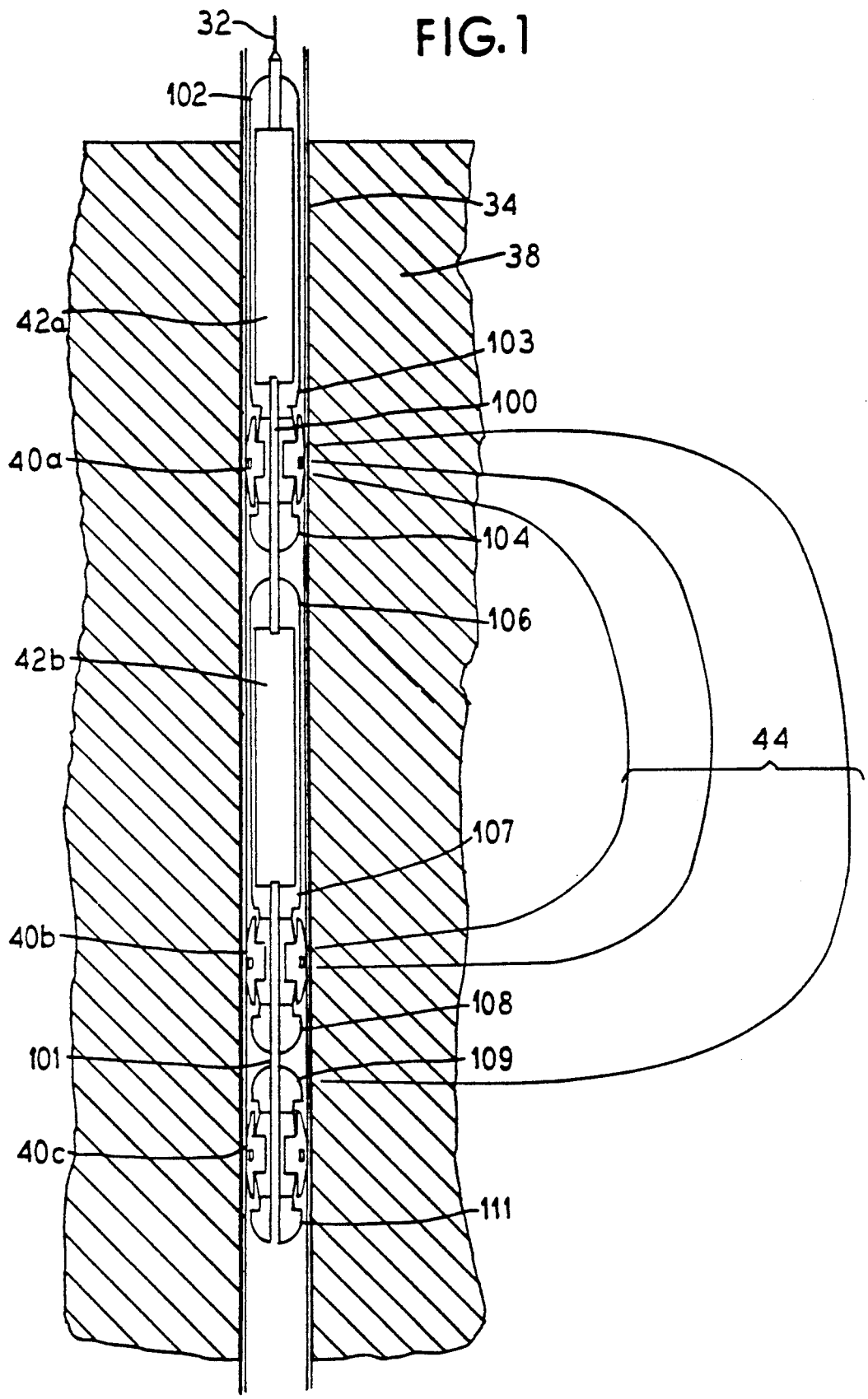
FIG. 1 is a schematic sectional view showing a preferred embodiment of the invention in a pipe and showing magnetic lines in the earth.

FIG. 1 illustrates the surrounding earth's formation 38 into which a pipe or casing 34 has been inserted into a bore hole. The logging tool of the invention is supported by an oil field electrical wire line 32 which is connected to one end 102 of a first electronic housing 42a. The second end 103 of the electronic housing 42a is connected by pipe 100 to a first logging unit 40a of the invention. The second end 104 of the logging unit 40a is connected by the pipe 100 to the upper end 106 of a second electronic housing unit 42b which has a lower end 107 to which a second logging unit 40b is connected. If satisfactory electrical isolation can be found 42a and 42b can be combined in one structure. A supported pipe 101 extends through the lower end 108 of the logging unit 40b into an upper end 109 of a third logging unit 40c which has a lower end 111.

The units 40a, 40b, and 40c can be mechanically constructed identically and 40a may be used as a transmitter to radiate the radiation 44 which is detected by units 40b and 40c, for example.

Figure 2:
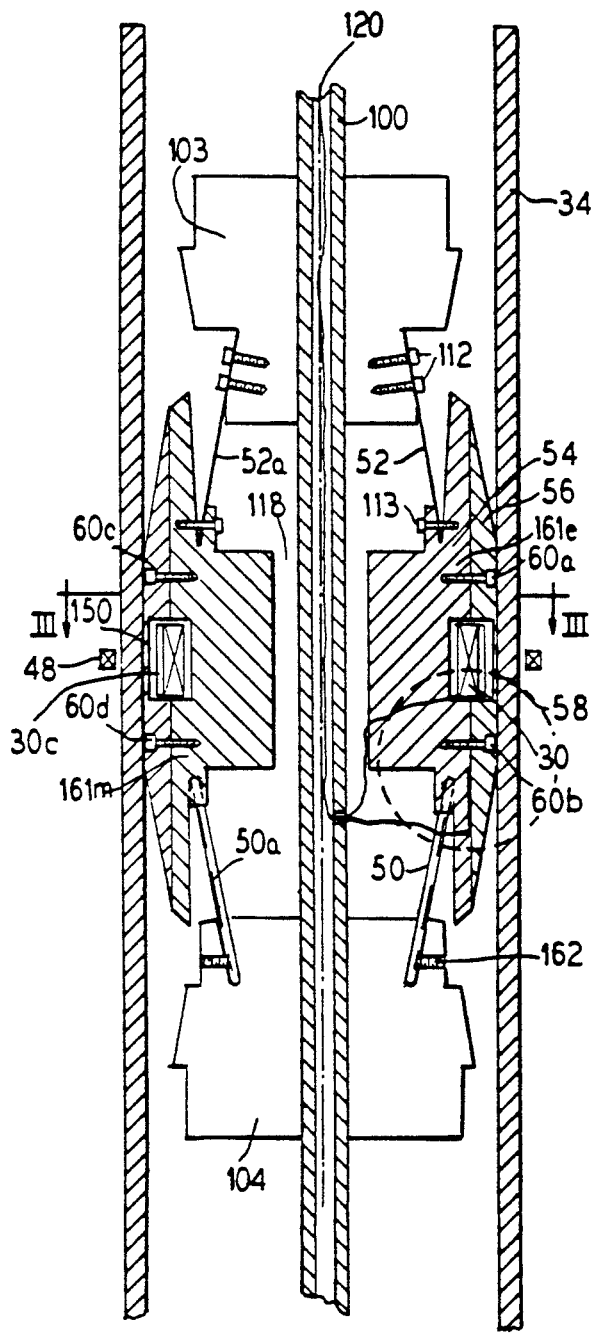
FIG. 2 is an enlarged fragmentary sectional view of a portion of FIG. 1.
Figure 3:
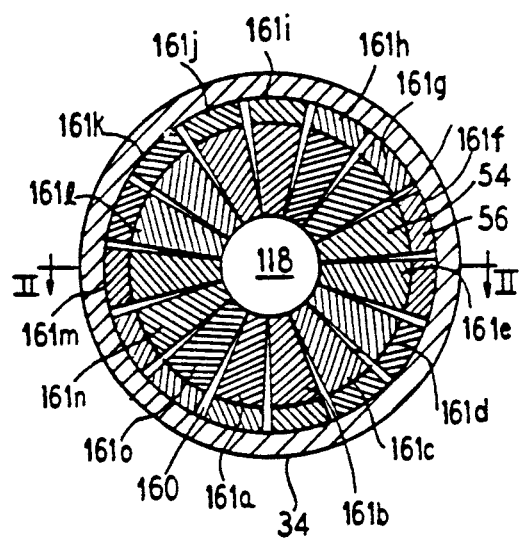
FIG. 3 is a fragmentary section corresponding to FIG. 2 but taken at right angles thereto.
Figure 4:
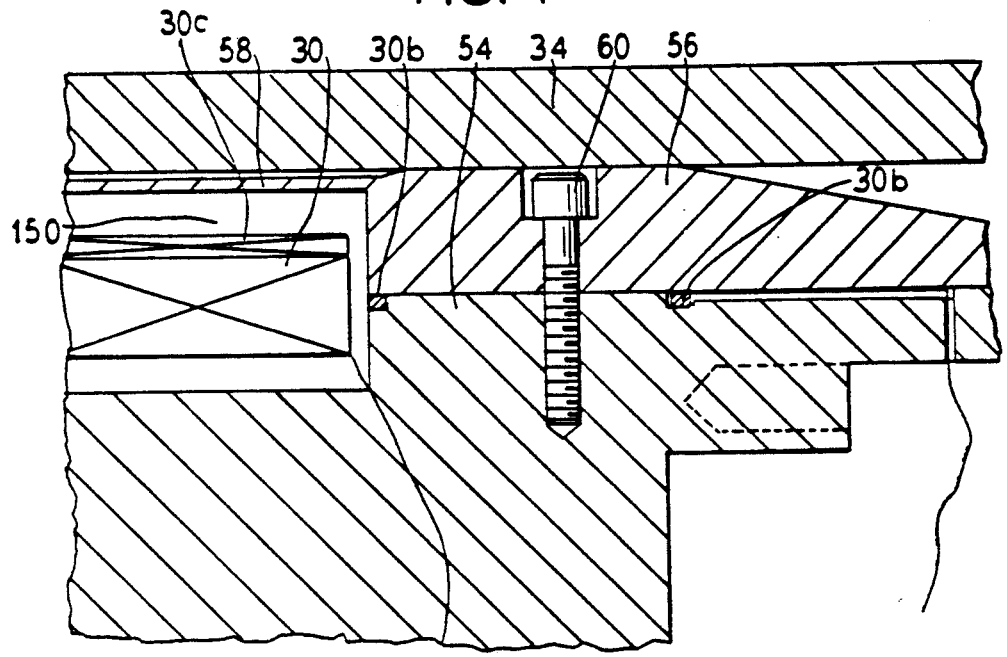
FIG. 4 illustrates an enlarged fragmentary section of FIG. 2 as indicated by the dotted circle therein.

FIGS. 2, 3 and 4 illustrate in greater detail one of the units 40a, 40b and 40c.

So as to construct the pie-shaped segments units 40a, 40b and 40c, reference may be made particularly to FIGS. 2, 3 and 4. Two close-fitting tubes of steel are utilized to machine an outer member 56 which is tapered at both ends and an inner part 54 which is configured as shown in sectional view of FIG. 2. Bolts 60a, 60b, 60c, 60d are utilized to lock the members 54 and 56 together. A central annular opening 150 is formed in the members 54 and 56 as shown in FIGS. 2 and 4 and then the members 54 and 56 are cut in the longitudinal direction relative to the pipe 34 into sixteen individual longitudinal segments as shown in section in FIG. 3. Then one of the sixteen segments is removed and the remaining fifteen segments are radially distributed equidistant from each other so as to allow the segments in the structure to conform to the casing inside diameter anomalies. The sixteenth segment is not used in the structure assembly and therefore is not shown in the attached drawings. The spacing 160 between the segments also allows the passage of fluid through the tool as it moves up and down the well. Each of the segments 161a through 161o is supported between the upper and lower members 103 and 104 by upper bow strings 52 and 52a and lower bow springs 50 and 50a as shown in FIG. 2. For example, the segment 161e is shown in the right portion of FIG. 2 and the segment 161m is shown in the left portion of FIG. 2.

This whole structure including segments 161a–0, springs 50a–o and 52a–o are assembled in such a way as to allow the segments 161 to conform as exactly as possible to the inside diameter of the pipe. The segment 161 needs the most intimate contact possible to obtain maximum magnetic metal to metal contact with the pipe in order to eliminate "air gaps" and still maintain mechanical integrity. The bolts 113 pass through loose holes in the springs 52 to allow segments 161 to rock and conform to the pipe ID on all axes of motion. We have found it expedient to use wire springs 50 anchored to 104 with set screws 162 allowing the segments 161 limited freedom to telescope and rock on all axes in order to conform to pipe irregularities.

The outer members 56 form shoe structures on each of the segments as illustrated which are connected by the bolts 60 to their associated member 54 of each segment. The springs 50 and 52 urge the segments 161 outward to an engagement with the inner surface of the pipe 34. An isthmus portion 58 covers the opening 150 in which the coils 30 and 30c are mounted and the isthmus 58 serves as a mechanical shield and protector for the coils 30 and 30c. This bridge 58 also offers a smooth mechanical surface so as to prevent the tool from catching and hanging up in the well. The bridge or isthmus 58 preferably may be constructed of nonmagnetic material, but can be also of the same iron material as the shoes because it is thin and it connects across the poles and quickly saturates and thus has little effect on the final measurements. When the coil 30 is electrically energized, the segments 161 including the parts 54 and 56 become powerful electromagnets. The coil 30 is a loose fitting hoop-like coil which surrounds and simultaneously energizes all of the segments 161 in the structure. The structures 40b and 40c are formed in the same fashion as 40a illustrated in FIGS. 2, 3 and 4 and each of these structures is a device to directly couple and concentrate magnetic lines produced by the current in the coil 30 into the pipe 34 so as to drive the pipe 34 to a current density greater than one oersted and preferably 200 or more oersteds.

It is important that the driving structures 40a, 40b, and 40c have a high permeability magnetic cross-section which is greater than the cross-section of the pipe and have ability to carry more magnetic lines than the pipe. The pipe is part of the magnetic circuit and it must be effectively saturated before any measuring portion of the structure saturates so that the thickness of the pipe can be determined. One of the reasons for working at high exciting currents is to provide a casing inspection tool which is capable of working in a region where the magnetic characteristics of the iron in the casing are not greatly affected by physical strains in the pipe or by heat treatment or by minor impurities in the pipe.

FIG. 4 is an enlarged sectional view taken in the region of the dash circle shown in FIG. 2. FIG. 4 shows the averaging sensing coil 30c which is wound along with coil 30 and encircles all segments. A segment pickup coil 30b, one each of which is wound around each segment 161, is also illustrated in one of the positions where it can measure the power dissipated only in that particular segment 161, and therefore measure the thickness of the pipe 34 immediately adjacent to an individual radial segment 161 of the structure. So as to detect the average wall thickness of the pipe in the section being inspected the outputs of coils 30b can be algebraically summed or the output of coil 30c can be measured.

Figure 5:
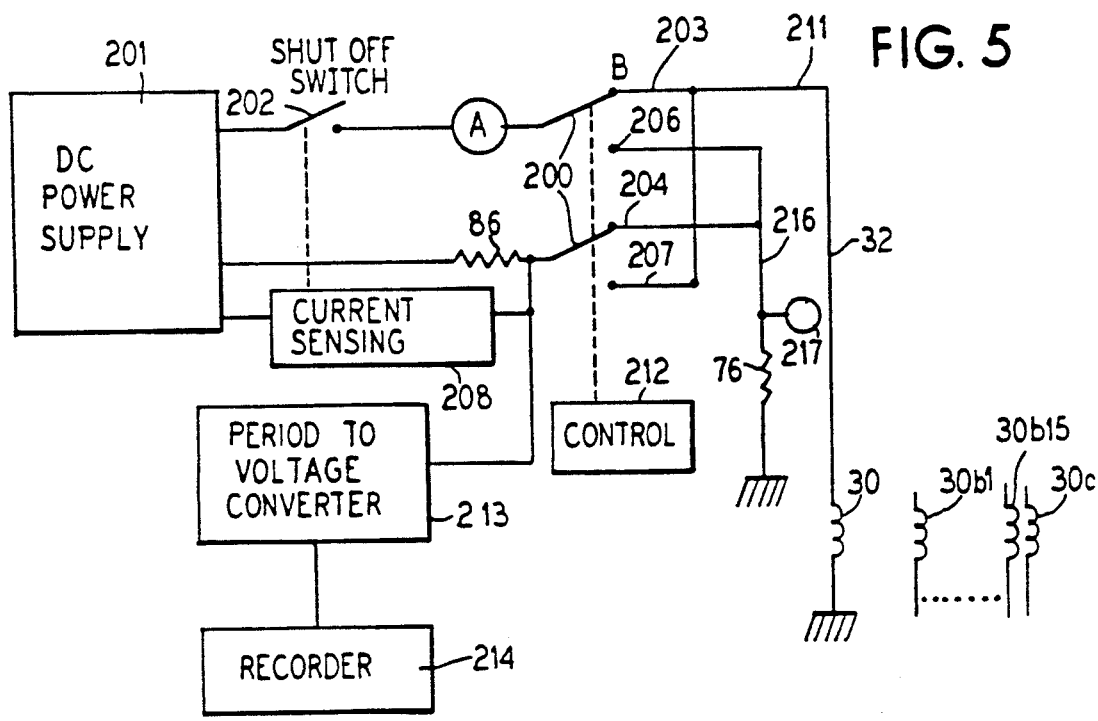
FIG. 5 is an electric schematic of casing inspection tool.

FIG. 5 is an electrical schematic diagram of the circuit used to energize structure 40a for the purpose of casing inspection. A DC power supply 201 is connected through a shut-off switch 202 that is controlled by current sensing device 208 and supplies reversing switch 200 which moves contacts of the switch between terminals 203 and 204 and 206 and 207 so as to reverse the current supplied on line 211 which is connected to line 32 which is the insulated conductor of an oilfield service line which is connected to coil 30. The DC power supply may supply 200 volts which is reversed each 100 milliseconds by control 212. This produces a 5 hertz square wave which in this case is fed into line 211 and then to line 32 which drives the coil 30. A measurement is made each time control 212 closes switch 200. How often that happens can be determined by time or tool travel in the well or both.

Figure 7:
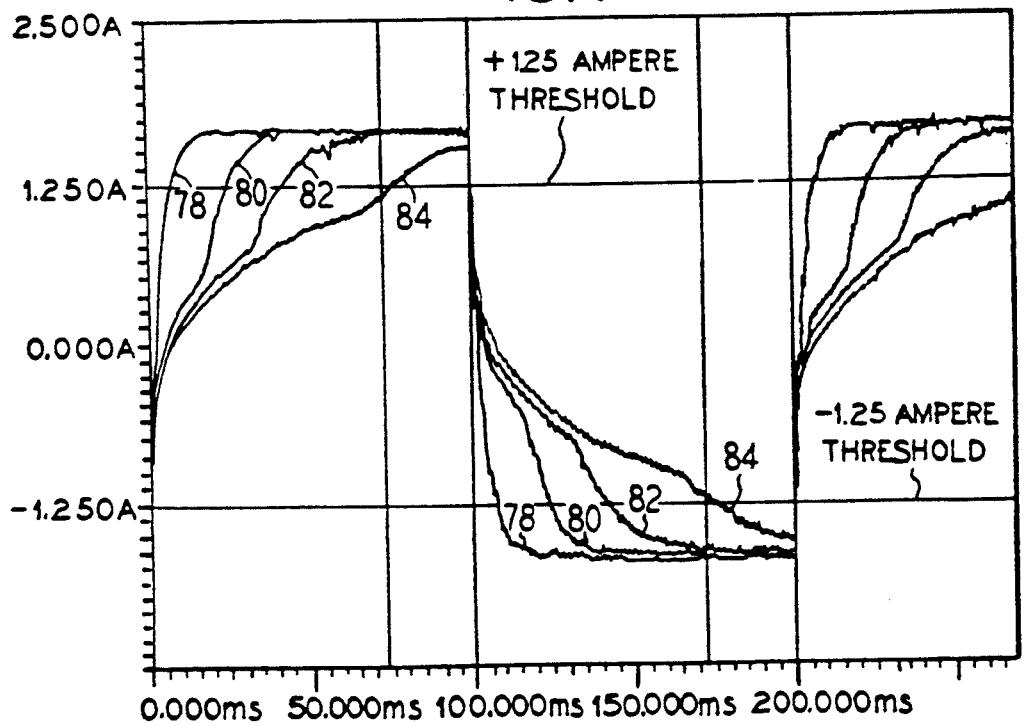
FIG. 7 is an actual recording of current reaction of four thicknesses of oil well casing when driven by a square wave voltage which is applied to the invention.

When the square wave FIG. 7 is applied to coil 30 the magnetic flux anchors the structure 40 in the pipe 34. At each reversal there is a very short time period when the tool can be moved. In order to keep down wear and tear it is desirable to program a short degaussing release signal between each energizing pulse to allow more time for the tool to move in the well. If proper degaussing is used the measuring current need not be reversed.

Figure 6:
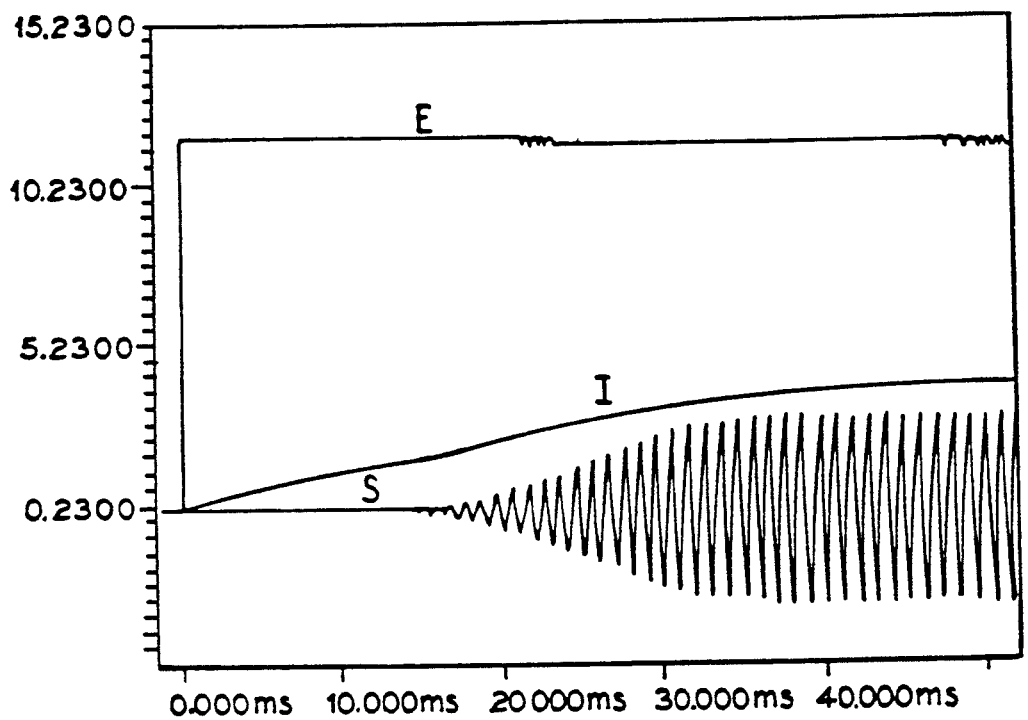
FIG. 6 is an actual recording of oil well casing becoming transparent to AC.

FIG. 6 is an actual recorded test showing how an AC signal will pass through the magnetically saturated pipe. E represents the voltage applied to coil 30. I is the current to coil 30 and S is the signal detected on the oscilloscope across coil 48. Coil 48 is a test coil positioned as shown in FIG. 2, outside of a laboratory test section of steel pipe of the type used for oil well casing 34.

FIG. 7 is an actual recorded test using a 12,000 foot simulated oil field logging line. A square wave voltage E, as shown in FIG. 6, is generated by the circuit illustrated in FIG. 5, which alternately applies +200 volts and −200 volts through switch 200 which passes current to wireline 32 and down the well so as to energize coil 30. The oscilloscope 217 connected to line 216 measures the voltage across a one ohm resistor 76 so that one volt equals one ampere.

Trace 78 FIG. 7 is produced by casing wall 34 which has a thickness of 0.000 inches. Trace 80 is produced by casing wall 34 which has a thickness of 0.075 inches. Trace 82 in FIG. 7 is produced by casing wall 34 which has a thickness of 0.150 inches and Trace 84 in FIG. 7 is produced by casing wall 34 which has a thickness of 0.300 inches.

Figure 8:
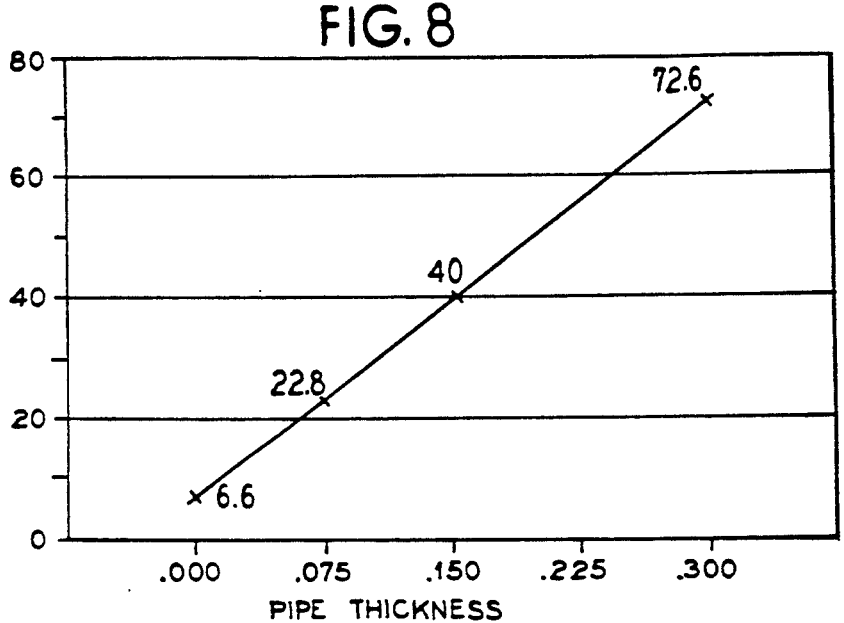
FIG. 8 is a curve of the saturation time vs pipe thickness.

FIG. 8 is a plot obtained by establishing a +1.2 and −1.2 ampere threshold at resistor 76 as illustrated in the traces of FIG. 7 and plotting the time in milliseconds against the pipe thickness which results in a graph which is a substantial straight line. Thus, starting at a given time after a given voltage is applied to coil 30 the time taken for the current to rise to a given current level is proportional to the thickness of the pipe 34 which is adjacent to structure 40. As can be seen from the threshold line in FIG. 7 and the plot in FIG. 8, the saturation time of the pipe is directly proportional to pipe thickness. This fact can be detected by the amount of current required to bring the pipe into saturation. This measurement can serve two functions in the invention. First, to detect average pipe thickness and second, to conserve power by shutting off the power to the exciting coil after the pipe is saturated and the power is no longer needed. Alternatively, an ammeter reading could be utilized.

Figure 9:
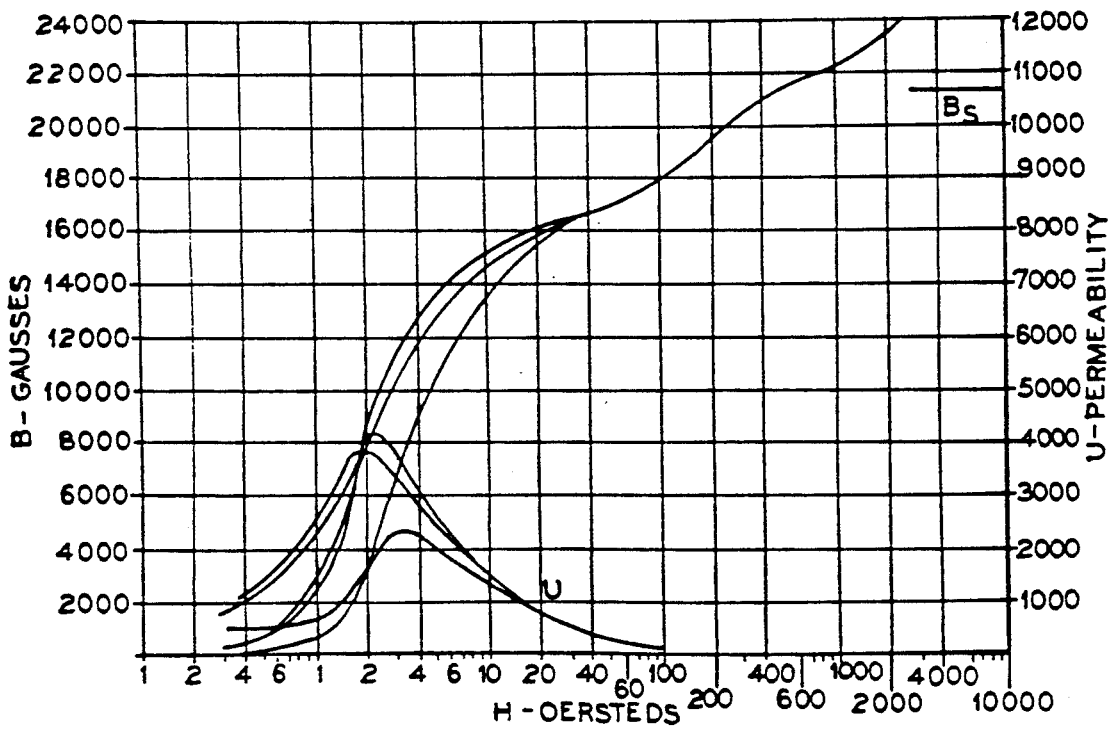
FIG. 9 shows United States Steel's normal magnetism curves for cold rolled structural steel for illustrative purposes only.

FIG. 9 is a normal magnetization plot of curves issued by the United States Steel Company for solid ungapped ring of common structural steel. It is to be noted that there is a knee in each of the incremental permeability curves labeled "U". To the left side of the knee especially in the region of one oersted, heat treatment can cause the change in permeability in the order of several hundred percent. It is in this region of low flux density that all commercial pipe line and casing inspection tools now work. The obtainable magnetic flux density for a given number of ampere turns and structural steel may be at least 14,000 times as great as for air. It is for this reason we obtain as close a metal to metal contact as possible so as to minimize the air gaps. It is noted that as long as the measurements are made at greater than 20 oersteds, heat treatment of the steel makes no difference in the magnetic permeability of the steel as is shown in the curves labeled "U". For this application, field strength greater than 4 oersteds will be used to make the casing go into saturation. By operating in this realm of high magnetic flux several physical phenomena take place.

Phenomena #1 is that if measurements are taken at greater than 20 oersteds, the heat treating of the tubular goods is inconsequential.

Phenomena #2: If current is applied to coil 30 and at the same time an exciting AC signal is applied (in this case 1000 hertz) to coil 30c which is wound around coil 30 no signal will at first be obtained on a coil 48 which is wound around coil 30 on the outside of the pipe over the member 58 as illustrated in FIG. 2. The test coil 48 is connected to the input of the oscilloscope which produces trace "S" of FIG. 6. FIG. 6 is for a typical illustrative purpose. Coil 48 is a test coil and cannot be used in an actual well. As the pipe becomes saturated, the pipe gradually becomes magnetically transparent and a strong AC signal may be detected outside of the pipe as shown by the trace "S". This signal has been passed through a commercial filter tuned to 1000 hertz. This shows that after 16 milliseconds the pipe begins to become transparent and gradually its transparency increases and by 35 milliseconds it is as transparent as it will become as illustrated in FIG. 6. This transparent window through the pipe is a two-way window. AC signals can go out of and come into the window to and from the surrounding earth. The strength of the signal received at 40b or 40c is inversely proportional to the resistance of the earth due to the attenuation of the signal "S" as it passes from the transmitter 40a to the receiver 40b and 40c. Thus, the invention allows an induction log to be made through the casing 34 of a producing well which has been impossible before the present invention.

Phenomena #3: The magnetic propagation speed up or down the pipe is extremely slow thus the pipe is an effective magnetic insulator at 1000 hertz along its linear axis.

Phenomena #4: After the electromagnetic force reaches out into the earth formation, it has a propagation speed in the order of 15% of the speed of light in air. After it is out in the formation, the magnetic lines are parallel to the longitudinal axis of the pipe and an electrical current is induced in the formation in a circular hoop-like pattern around the pipe which reacts to the formation resistance as it does in the conventional induction log.

Phenomena #5: The structures 40a, 40b, and 40c become traction magnets so as to firmly anchor the tool in the pipe. The structures 40a, 40b, and 40c are alternately anchored and released by reversing the current through coil 30. Thus, most measurements with the tool are made with the tool anchored and the well log is a series of incremental measurements. The elasticity of the cable supporting the tool in the well allows this even though the draw works at the surface is continuously operating.

Phenomena #6: When a secondary winding 30c is wound on coil 30, there is an induced voltage generated in that secondary. The time it takes for the secondary voltage to fall to a given voltage depends on the average wall thickness of the pipe. This allows the inspection of the average thickness of the casing or pipe by using either a primary or secondary winding or both.

Phenomena #7: A secondary winding 30b is wound anywhere around the magnetic flux path of one of the segments as is shown in FIG. 4. There is an induced voltage generated in 30b when the coil 30 is energized and the time taken for the induced voltage to fall to a given voltage depends on the wall thickness or integrity of the pipe 34 which is immediately opposite the middle of that segment at member 58. By this means, individual segmental sections of the casing or pipe can be inspected for holes, pitting, wear and other inhomogeneities. If the average wall thickness of the pipe at that point is not normal, a compensating factor obtained from the average wall thickness measurement may be entered into the measurement so as to produce true wall thickness measurement at a localized segment depth in the pipe wall and at a point on the circumference of the pipe with previously unattainable accuracy and precision.

In each of the structures 40a, 40b and 40c as shown in FIG. 3 there are fifteen segments. However, there can be a larger or smaller number of such segments. Each coil 30b, one on each of the fifteen segments, generates an independent signal which can be multiplexed and transmitted to the surface, demultiplexed and separately recorded. Any one of the vast number of multiplexers, analog, digital, compressed, decompressed, FFT-IFFT or any other technique used in modems may be used for this transmission. Accurate analog measurements of the recorded signal can be made by zeroing both the analog multiplex transmitter and demultiplexer receiver between each channel of transmission.

Phenomena #8: At any given time, the poles at one end of each and all segments are of the same polarity. Since magnetic lines of like poles repel, the segments tend to focus the magnetic lines of force into the casing. This gives casing inspection effects to a localized narrow stave-like increment at each of the segments on both longitudinal and circular axes of the pipe. Therefore, a section of the casing the size of the pole face or smaller than the pole face can be inspected with good accuracy.

The structures 40a, 40b and 40c are internal magnetic coupling devices to concentrate magnetic lines in the pipe being inspected. The same magnetic principles can be used to inspect the inside of a pipe from the outside of the pipe such as an oil well tubing by making a conforming external magnetic structure so as to concentrate the magnetic lines into the tubing being inspected.

The purpose here is to open windows in the pipe in order to electrically or inductively log earth formations through oil well casing.

We have found that if we magnetically saturate the steel casing it becomes transparent to magnetic lines in both the transmitting and receiving functions.

Heretofore all efforts to electric log through the oil well casing have been thwarted because the casing presents a virtual dead short across all electrodes used for measurement thus the comparatively very high resistance effect of the earth is effectively shorted out by the comparatively infinitely low resistance of the casing. The logging industry has published that it is impossible to inductively log through the casing.

We have found that after the casing is driven into magnetic saturation by a magnetic field that a disk shaped magnetic field bursts out into the surrounding area. If while the iron is saturated an alternating current is applied to the coil which has been used to saturate the pipe a disk shaped alternating magnetic field bursts out into the surrounding area.

Magnetic lines pass through the magnetically saturated casing in contrast to electrical signals which are shorted out.

Once out in the surrounding medium the electromagnetic waves behave according to the laws of electromagnetic radiation in that surrounding medium be it air or earth and the attenuation of the signal depends on the loss characteristics of the surrounding medium.

The volume of the earth is, for purposes of measurement, infinitely large and its impedance varies by orders of magnitude, in comparison to the casing which is of finite dimensions and is held to close commercial tolerances. The casing along its length is an insulator at the frequencies used in this device.

The effects of the casing at a distance from the transmitter rapidly become a declining factor in the measurement. At a distance from the transmitter the characteristics of the earth soon become the predominate effect.

Figure 10:
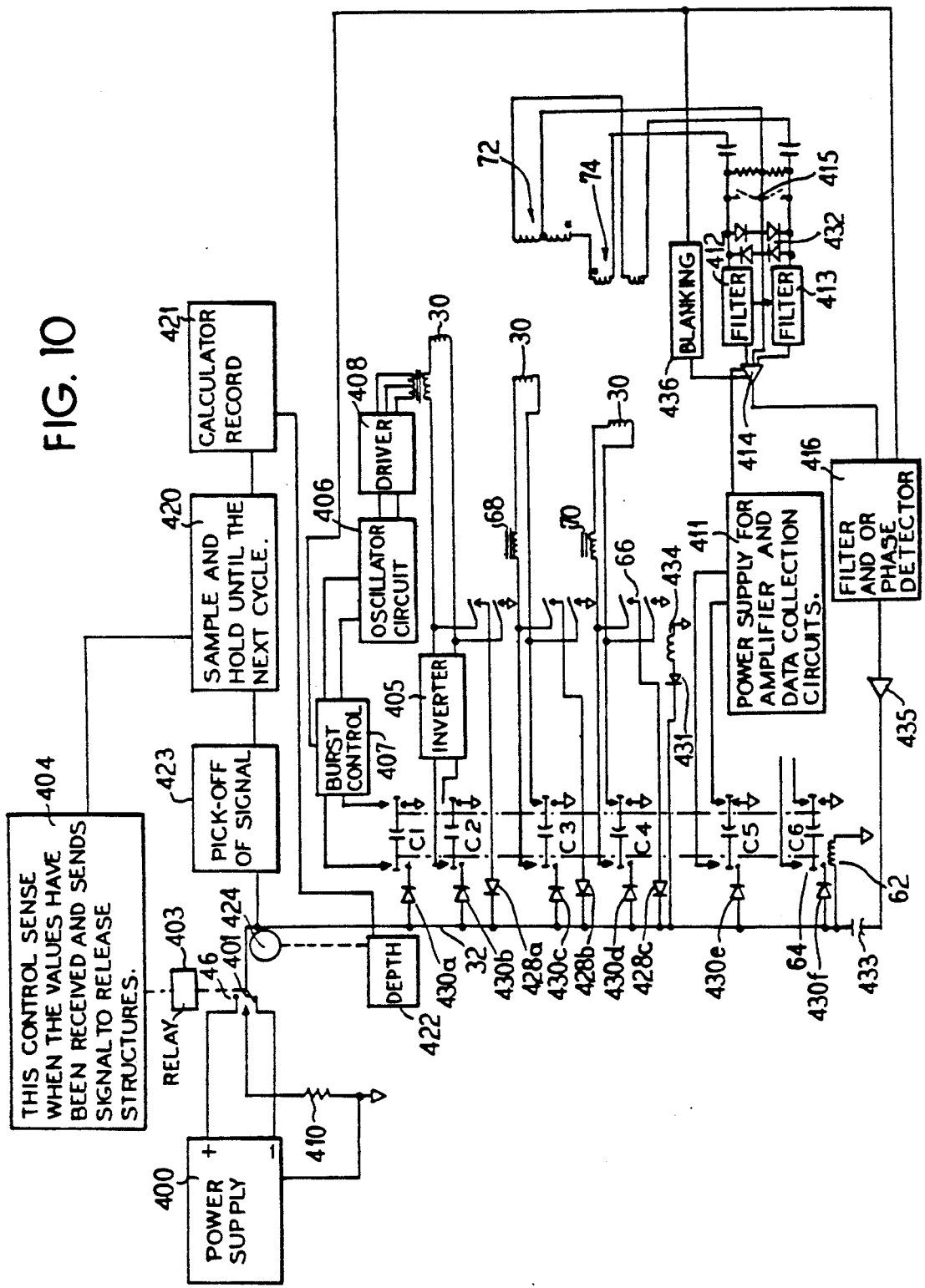
FIG. 10 is an electrical schematic of the invention which is used to log earth formations through the oil well casing.
Figure 11:
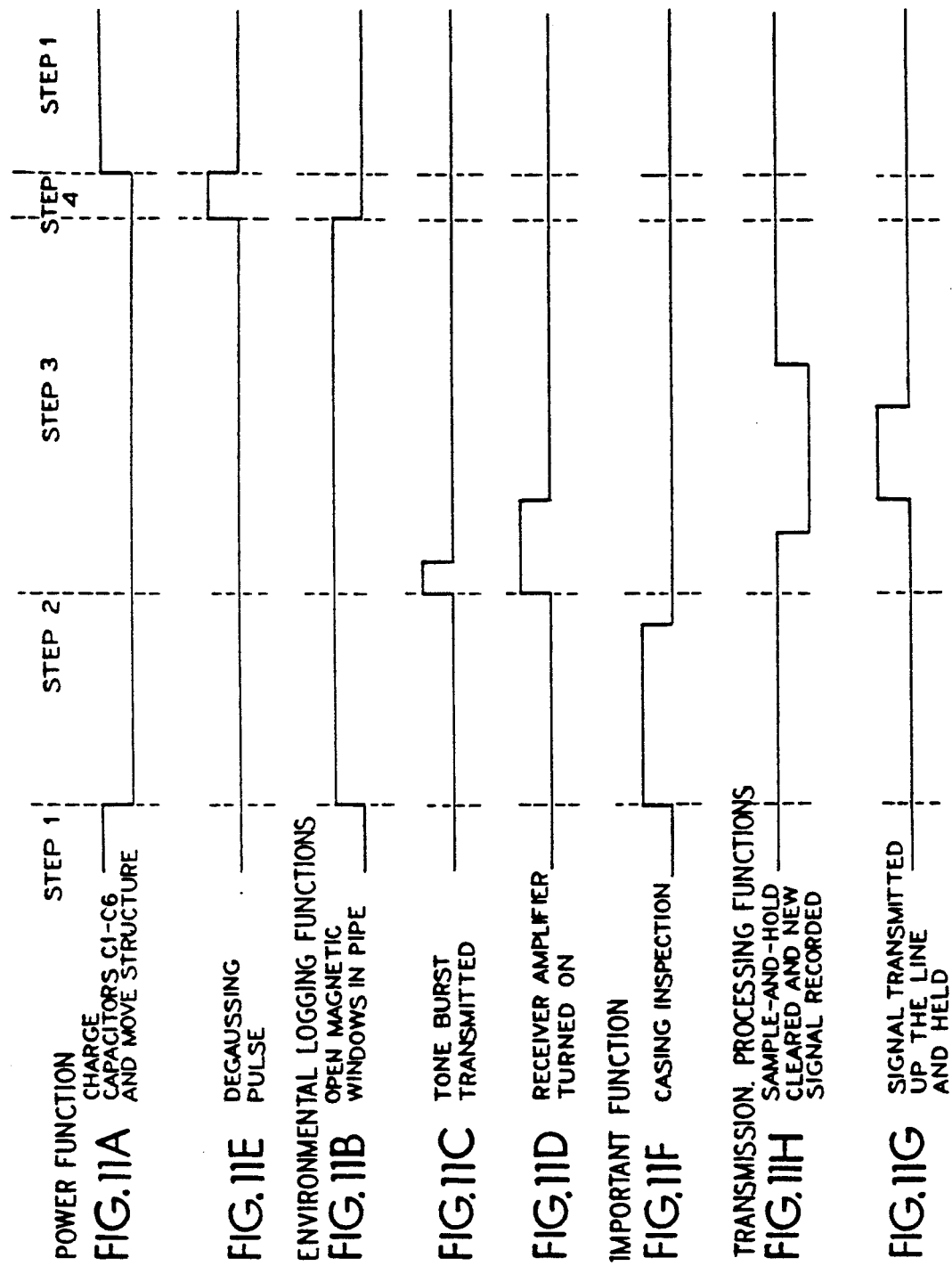
FIG. 11A–11H are curves showing time sequences of measurement using the invention to log earth formations through the casing.

FIGS. 10 and 11 illustrate one way that the measurements have been made. It should be understood that we are not limited by this circuit and sequence but this is merely one means of operating.

STEPS OF OPERATION OF LOGGING THRU CASING TOOL

To inductively log through the casing the following steps are desirable or necessary.

Brief Description

Step 1.

Supply power to the tool in the well and store power (if necessary) for the measurement.

Step 2.

Properly isolate the power supplies to the transmitter and the receiver(s). Open magnetic windows through the pipe. While these windows are open the tool is anchored. Check the seating of structures 40 (casing inspection is an optional but desirable step to improve accuracy of geophysical measurement).

Step 3.

While the tool is anchored a tone burst is turned on and the amplifier 141 in FIG. 10 is turned on to make the geophysical measurement. An alternative to the tone burst is to use the transient edge of the window current. Filtering is easier with a fixed frequency tone burst. Transmit the geophysical measurement to the surface and record it. Transmission can take many forms. The tone burst may be frequency processed such as frequency modulated, phase modulated or other to enhance the geophysical measurement. The receiver may use phase locked loop or synchronous detection. The received signal may also be processed by any or many of the steps used in modems to enhance the geophysical measurements.

Step 4.

Release the magnets. This is desirable to reduce wear and tear on the tool. Move the tool. (The draw works at the surface operates at a constant rate.) This is not essential but is common practice for economic well logging. For high precision, a series of stationary step wise measurements may be summed and averaged or otherwise mathematically processed to better examine a zone of interest in the well.

DETAILED DESCRIPTION OF STEPS OF OPERATION WITH REFERENCE TO FIGS. 10 AND 11A-H.

Step 1.

A 3-position switch 401, in the energizing position, connects the wireline 32 to the positive potential of the power supply 400. If a positive potential is applied to wireline 32 current flows to relay coil 62 closing the contacts of relay 64 which connect wireline 32 through diodes 430a-430f to charge the storage capacitors C1-C6 to a predetermined potential as illustrated in FIG. 11A.

Step 2.

To start the sequence of measurements the power is removed from the line 32, the relay 64 drops out or moves to second position completely isolating the capacitors C1-C6 from the line and from each other and from all common connections, connecting each window coil 30 to its separate capacitor sending current through each isolated window coil 30 which magnetically saturates the pipe adjacent to each structure 40a, 40b and 40c opening a magnetic window at each location as illustrated in FIG. 11B. An inverter 405 may be used to match the window power to coil 30 where desired. By detecting the signal from coils 30c on each structure, or the average current to coil 30, it can be determined if the segments 161 of the structures 40a, 40b and 40c are properly seated and if there are casing anomalies. This signal may be used to correct casing anomalies that may interfere with true geophysical measurement of the surrounding formation 38. This measurement can also be used to determine the average wall thickness, i.e. casing inspection as illustrated in FIG. 11F.

Step 3.

At a prescribed time after window coil turn on, a timing device within the down hole tool turns on the burst control 407 which turns on the oscillator circuit 406 and the driver 408 which send a tone burst to coil 30 in structure 40a which is transmitted out into the formation through the magnetic window in the pipe which is created by and surrounds structure 40a. This is illustrated in FIG. 11C. The tone burst is used in the interest of power efficiency. If efficiency is of no interest a steady state note may be used.

The tone burst is received by the receiver structure 40c, and optionally by bucker structure 40b. Isolation chokes 68 and 70 prevent the received signal from being shorted by capacitors C3 and C4. The received signal is sensed by coils 72 and 74. Coils 72 and 74 are in receiver structure 40c and bucker structure 40b, respectively, and are wound in the position of coil 30c, are preferably bifilar wound and are connected in bucking relationship. The power necessary to open the windows is orders of magnitude greater than the received signal, therefore a voltage limiter 432 and/or an instantaneous short of switches 415 in the receiving circuit is necessary to protect the amplifier while the window is opening. The signal is transferred through the voltage limiter 432 and the filter network 412 and 413 to instrument amplifier 414 which is blanked by blanking circuit 436 until the tone burst is received as illustrated in FIG. 11D. The tone burst signal is further processed by a filter and/or a phase detector 416. The measured signal is then amplified by amplifier 435, and/or digitally processed and coupled to the wireline 32 by using any of the many techniques of modern modems or a capacitor 433 and sent up the wireline 32 as illustrated in FIG. 11G.

In the meantime switch 401 has been switched to the record position, connecting the wireline 32 to a load resistor 410 which drains unwanted noise from the system including the wireline 32. The signal pick-off device 423, which may use any processes common to modern modems, receives the signal from down the wireline 32 and transfers it to the sample and hold device 420 which holds the measurement from one cycle to the next so the recorder 421 can record and store the measurement, as illustrated in FIG. 11H.

Step 4.

When the control 404 senses that the measurement signal has been received it moves the switch 401 to the release position sending a pulse of negative current down the wireline 32 as illustrated in FIG. 11H. This current travels through diode 431 and release relay coil 434 closing the contacts of release relay 66 connecting coils 30 to the wireline 32 through diodes 428a, 428b and 428c and produces a pulse of negative current. This degausses the structures 40a, 40b and 40c magnetically releasing them from the pipe 34. This completes the measuring cycle. When the tool is magnetically released, it can be moved up the well by the draw works and the wireline 32 or down the well by gravity.

All of the above geophysical measurements, preferably for economic reasons, will be made with a continuously running draw works but any of the measurements could be made with the system stationary.

FIG. 11 illustrates a timing diagram of pulse train and FIG. 10 is an electrical block diagram used to make an induction log through the casing of an oil well. This log is a series of measurements taken as the tool is moved up and/or down the oil well. The depth at which the measurement is taken in the well can be controlled by a measuring sheave which is commonly used in oil fields and is well known to those skilled in the art to which the present invention pertains. These measurements may also be controlled by time. So as to log the earth formation 38, the casing 34 must be made transparent as shown in FIG. 6 at spaced depth points as determined by the mechanical spacing down the length of the tool. This can be accomplished by simultaneously energizing the transmitting structure 40a and the receiver structure 40c. So as to focus the log at the same time we may energize bucking structure 40B. This is accomplished by simultaneously energizing coils 30 of structures 40a, 40b and 40c, in FIG. 10. This is defined as opening windows through the pipe as is illustrated in FIG. 6.

The average oil well cable does not have the current carrying capacity to carry sufficient energy to open all the windows at once so energy is stored in between measuring cycles. For this purpose, capacitors C1, C2, C3, C4, C5, and C6 in FIG. 10 are utilized. Each of these capacitors performs an even more important function of furnishing totally isolated sources of power for each function in each of the structures 40A, 40B and 40C. Isolation is extremely important because there are vastly different power levels in each of these structures as they operate. For instance, the power needed for the function of opening the receiver windows may be one million times greater than the level of received signal through the casing from the surrounding earth.

FIGS. 11A-H illustrate the time sequence to accomplish the logging. Once the tone burst is out in the earth, the earth attenuates the signal just as it does in open hole induction log and is detected in structure 40c. Most open hole induction logs are focussed logs. For this reason it is desirable under some conditions to use a bucking structure 40b so as to focus the log. Those skilled in the art to which the present invention pertains understand the advantage and method of using bucking logs and reference may be made to such known techniques. However, in the present invention there is an additional benefit in that bucking also helps compensate for casing differences. It is seen that this invention provides a new and novel logging technique and although the invention has been described with respect to preferred embodiments, it is not to be so limited as changes and modifications can be made which are within the full intended scope of the invention as defined by the appended claims.

Figure 12:
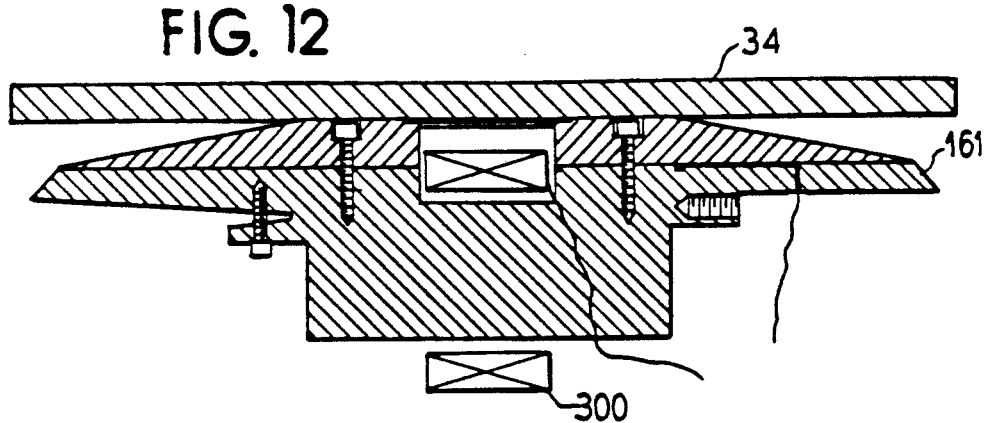
FIGS. 12, 13 and 14 are to illustrate the ability to focus the magnetic lines of force to resolve fine details in the pipe being inspected.
Figure 13:
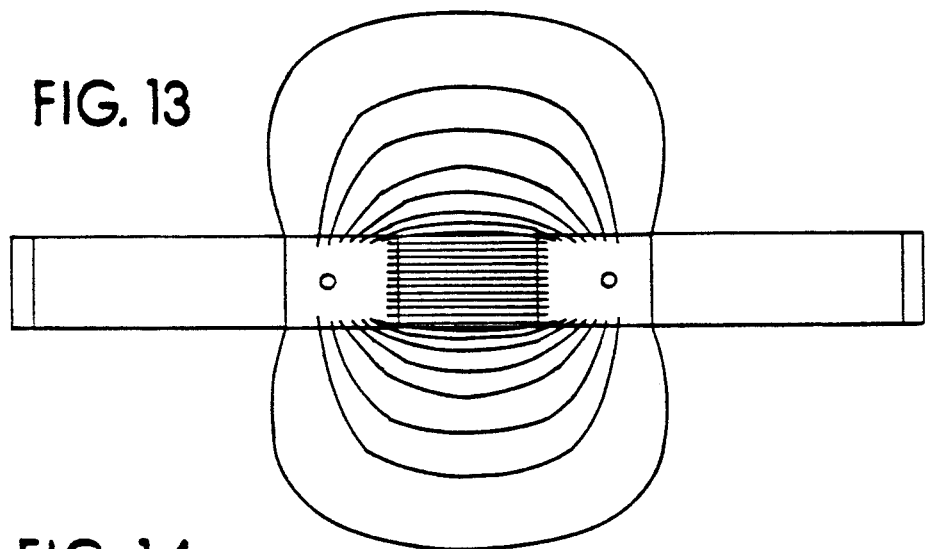

FIGS. 12 and 13 illustrate the classic elliptical magnetic field pattern of a horseshoe magnet produced at the outside surface of the pipe 34 when a single segment 161 is excited by a single DC coil 300 wound around segment 161.

If the coil 300 is excited as is illustrated in FIG. 7 a similar wave form is produced for various pipe thicknesses.

Figure 14:
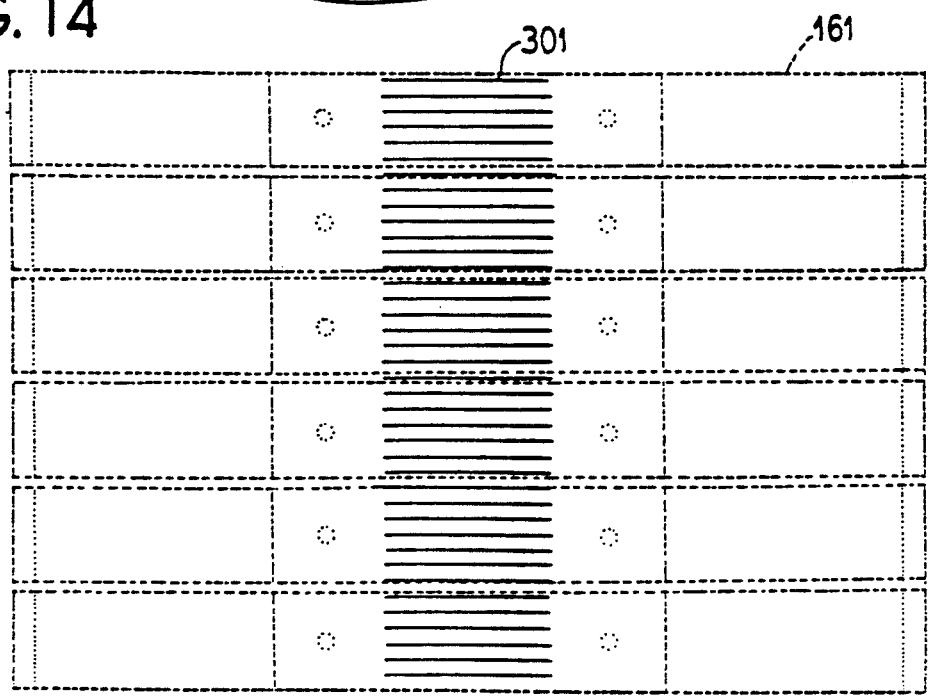

If the single isolated segment 161 is excited as above and is moved across a ⅜ inch hole drilled in the casing 34 no change was observed for indication of the hole. The reason for this is that the permeability of the pipe 34 is in the order of 10,000 while the permeability of air is but one, thus the magnetic lines of force take the path of least resistance through the pipe around the hole and the hole has virtually no effect. FIG. 14 illustrates the magnetic field pattern on the outside of the pipe when the segments are adjacent to each other. To illustrate that pattern, the segments are shown as if they were "unrolled" from the structure. By contrast to a single isolated segment, if the magnetic field is measured at the outside of the pipe 34 while the structure 40 is excited by coil 30 exciting all segments 161 at once the pattern of straight lines of magnetic force as illustrated at 301 are produced. The field of each segment guards its own territory. This is because "parallel magnetic lines of force traveling in the same direction repel one another." (BASIC ELECTRICITY, Prepared by THE BUREAU OF NAVAL PERSONNEL) Fringing line energy is directed into straight lines. This means that if the same ⅜ inch hole is drilled in the casing and the structure 40 is excited as in FIG. 7 that the segment 161 over the hole generates significantly less voltage in coil 30b than the other coils 30b around the other segments 161 which are in contact with solid casing wall.

Thus we can focus the inspection to as many sections of the pipe 34 on the circumference as we have segments 161 in the structure 40. This improves the focus on both horizontal and vertical axes.

By forcing all magnetic lines to take parallel paths the structure 40 can be driven with less power.

By moving the structure 40 up the well a detailed three dimensional inspection of the casing can be made.

By the simultaneous parallel excitation of the segments 161 the classic parabolic magnetic flux line pattern of the horseshoe magnet is directed into a straight line pattern through the area of inspection. The Navy text "BASIC ELECTRICITY" states, "magnetic lines of force will never cross one another". This means that the lines generated by each segment 161 guards its own area, blocking neighboring flaring lines and thus measure its own area of investigation separately and individually, producing a log of heretofore unobtainable resolution.

One means of describing our structure 40 is that it is a ring of horseshoe electromagnets with all magnetic poles magnetically opposing, each magnet guarding and measuring its own individual area. This same type of flexible structure, if unrolled to conform to the surface, can be made to inspect a member of almost any shape, for instance, sheet metal or boiler plate.

We claim as our invention:

1. The method of determining the thickness of a magnetic pipe comprising the steps of:
    inserting into said pipe a wound coil which has its radius aligned with the radius of said pipe and said coil being closely magnetically coupled to said pipe;
    applying a voltage to said coil at an initial time;
    monitoring the current through the coil caused by said voltage;
    measuring the time from the initial application of said voltage that it takes for the current to reach a value at which the pipe is substantially magnetically saturated; and determining the thickness of said pipe from the measured time.

2. The method of determining the thickness of a magnetic pipe according to claim 1 wherein said voltage is a square wave.

3. The method of determining the thickness of a magnetic pipe according to claim 1 wherein said voltage is a square wave that varies between positive and negative values.

4. The method of determining the thickness of a magnetic pipe according to claim 1 wherein a plurality of secondary coils are mounted about said coil at different angular positions relative to said pipe, comprising the steps of monitoring the induced current through each of said secondary coils caused by said voltage applied to said coil; measuring the times from the initial application of said voltage that it takes for the induced current to reach values at which the pipe is substantially saturated at each angular position, and determining the thickness at each angular position of said pipe from the measured times.

* * * * *